United States Patent
Frew et al.

(10) Patent No.: US 8,013,473 B2
(45) Date of Patent: Sep. 6, 2011

(54) DETECTOR BASED COMBINATION REGULATOR

(75) Inventors: Louis Frew, Glasgow (GB); Colin Bates, Lanark (GB)

(73) Assignee: Atmel Corporation, San Jose, CA (US)

( * ) Notice: Subject to any disclaimer, the term of this patent is extended or adjusted under 35 U.S.C. 154(b) by 563 days.

(21) Appl. No.: 11/538,613

(22) Filed: Oct. 4, 2006

(65) Prior Publication Data

US 2008/0054721 A1    Mar. 6, 2008

Related U.S. Application Data

(60) Provisional application No. 60/841,847, filed on Sep. 1, 2006.

(51) Int. Cl.
*H02J 1/00* (2006.01)

(52) U.S. Cl. .......................................... 307/87; 307/130

(58) Field of Classification Search .............. 235/492; 307/130, 66, 80, 87, 140
See application file for complete search history.

(56) References Cited

U.S. PATENT DOCUMENTS

| | | | |
|---|---|---|---|
| 4,617,473 A * | 10/1986 | Bingham ...................... 307/66 |
| 5,206,495 A | 4/1993 | Kreft | |
| 5,555,182 A * | 9/1996 | Galm ........................... 702/69 |
| 5,777,903 A * | 7/1998 | Piosenka et al. ............ 708/100 |
| 5,845,217 A | 12/1998 | Lindell et al. | |
| 5,889,431 A | 3/1999 | Csanky | |
| 5,929,416 A * | 7/1999 | Dos Santos Pato et al. .. 235/439 |
| 5,973,484 A | 10/1999 | Cho | |
| 6,003,777 A * | 12/1999 | Kowalski ...................... 235/492 |
| 6,150,803 A | 11/2000 | Varga | |
| 6,177,783 B1 | 1/2001 | Donohue | |
| 6,225,708 B1 | 5/2001 | Furukawa | |
| 6,566,935 B1 * | 5/2003 | Renous ......................... 327/408 |
| 6,642,631 B1 | 11/2003 | Clavette | |
| 6,724,588 B1 | 4/2004 | Cummings et al. | |
| 6,933,772 B1 | 8/2005 | Banerjee et al. | |
| 6,979,983 B2 | 12/2005 | Yen et al. | |
| 7,109,691 B2 | 9/2006 | Brooks et al. | |
| 7,246,750 B2 * | 7/2007 | Cho ............................. 235/492 |
| 7,332,896 B2 | 2/2008 | Shin et al. | |
| 7,554,383 B2 | 6/2009 | Arisawa et al. | |

(Continued)

FOREIGN PATENT DOCUMENTS

CN  1637780 A  7/2005

(Continued)

OTHER PUBLICATIONS

Ayers, John E., "Digital Integrated Circuits Analysis and Design", USPTO Aug. 17, 2004, CRC Press, pp. 261-264.

(Continued)

*Primary Examiner* — Jared J Fureman
*Assistant Examiner* — Daniel Cavallari
(74) *Attorney, Agent, or Firm* — Fish & Richardson P.C.

(57) ABSTRACT

Methods and apparatus provide multiple input voltage regulation in which one regulator is selected for operation based on input power conditions. In one example, a dual input voltage regulator system in a combination smart card selects between contact and contactless (e.g., RF) operation based on which power source provides the highest available voltage level. A single transistor drop architecture provides low dropout voltage regulation capability without substantially increased transistor size. In some implementations, multiplexed control of the regulators for each of a number independent power source inputs may be arranged to substantially reduce or prevent reverse current flow through regulators connected to inactive power inputs.

23 Claims, 6 Drawing Sheets

U.S. PATENT DOCUMENTS

| | | |
|---|---|---|
| 2004/0210406 A1 | 10/2004 | Bui et al. |
| 2005/0046461 A1 | 3/2005 | Huang et al. |
| 2005/0150488 A1 | 7/2005 | Dave |
| 2006/0017423 A1 | 1/2006 | Frith et al. |
| 2006/0022640 A1 | 2/2006 | Frith et al. |
| 2008/0084195 A1* | 4/2008 | Frew et al. .................. 323/282 |

FOREIGN PATENT DOCUMENTS

| | | |
|---|---|---|
| EP | 0736828 | 10/1996 |
| EP | 1713185 A1 * | 10/2006 |
| WO | WO 9749059 A1 * | 12/1997 |
| WO | WO 00/58815 | 10/2000 |

OTHER PUBLICATIONS

ATMEL Corporation, International Search Report and the Written Opinion of the corresponding PCT application No. PCT/US2007/077391 dated Apr. 28, 2008, 10 pages.

* cited by examiner

DETECTOR BASED COMBINATION REGULATOR

CROSS-REFERENCE TO RELATED APPLICATIONS

This application claims priority to U.S. Provisional Application Ser. No. 60/841,847, entitled "Detector Based Combination Regulator," to Frew et al., which was filed on Sep. 1, 2006, and the subject matter of which is incorporated by reference herein.

TECHNICAL FIELD

Various implementations relate to electrical systems that have multiple power inputs.

BACKGROUND

Secure integrated circuit cards, commonly referred to as smart cards, may be of the form of an embedded integrated circuit hardware device that is small enough to fit into a user's pocket. Secure integrated circuit cards may be used in many situations where critical information must be stored and shared. For example, set-top boxes that facilitate pay-per-view or video-on-demand features may use a secure integrated circuit card to supply user account information to a provider along with a request for access to such features, and to subsequently decrypt encrypted digital video streams that may be provided in response to the request. As another example, a Subscriber Identity Module (SIM) card in a Global Systems for Mobile Communications (GSM) phone may be used to store a user's personal information, such as his or her phone book, device preferences, preferred network(s), saved text or voice messages and service provider information. A SIM card may allow a user, for example, to change handsets while retaining all of his or her information on the SIM card. Smart cards may be used in a variety of applications (e.g., electronic payment systems, including specialized auto-debit devices such as public transportation cards and personal identification documents, such as passports, drivers licenses, and medical identification cards).

Typically, smart cards send and/or receive data by communicating with an appropriate reader system. Some cards, commonly called contact cards, communicate with reader systems when the card makes direct electrical connection to a reader system. Data signals communicated over such direct contact interfaces may conform to a particular communication protocol, such as ISO/IEC 7816 or ISO/IEC 7810 (ISO refers to the International Organization for Standardization; IEC refers to the International Electrotechnical Commission). Other cards, called contactless cards, can communicate wirelessly with reader systems using RF (radio frequency) signals. RF data signals used by a contactless card may conform to a particular communication protocol, such as ISO/IEC 14443 or ISO/IEC 15693.

Various types of power sources may supply the electrical power used to operate the circuitry in an integrated circuit card. For example, some cards are powered by an integrated power storage device, such as a battery or large value capacitor. Contact type cards can be powered by making direct electrical contact with terminals connected to a power source, which may be, for example, a power supply that is integrated in a reader system. Contactless type smart cards may be powered by capturing and storing radio frequency (RF) energy transmitted by a reader system.

A hybrid type of smart card, sometimes called a combination card, can exchange data through either direct electrical contact or RF coupling to a reader system.

SUMMARY

Methods and apparatus provide multiple input voltage regulation in which one regulator is selected for operation based on input power conditions. In one example, a dual input voltage regulator system in a combination smart card selects between contact and contactless (e.g., RF) operation based on which power source provides the highest available voltage level. A single transistor drop architecture provides low dropout voltage regulation capability without substantially increased transistor size. In some implementations, multiplexed control of the regulators for each of a number independent power source inputs may be arranged to substantially reduce or prevent reverse current flow through regulators connected to inactive power inputs.

In various implementations, for example, disabling bias signals may be pulled up to a positive supply voltage or pulled down to a negative supply voltage. Recovery times during power source interruptions may be mitigated by supplying to unselected regulators a reference voltage slightly reduced from a target regulation voltage. Switching among available inputs may be subject to techniques such as filtering, delays, or other signal processing (e.g., averaging) to substantially reduce undesirable switching due, for example, to noise.

Some implementations may provide one or more advantages. For example, low drop regulation may be achieved with relatively small pass transistor sizes. In addition, low power operation may be achieved over a wide range of operating conditions by substantially reducing or preventing reverse (e.g., back feed) current flow through regulator transistors that are unselected or not coupled to inactive power sources. Performance is enhanced in some implementations by techniques for selecting which of a number of available power sources to use for operating electrical power.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EXAMPLES

Figure 1:
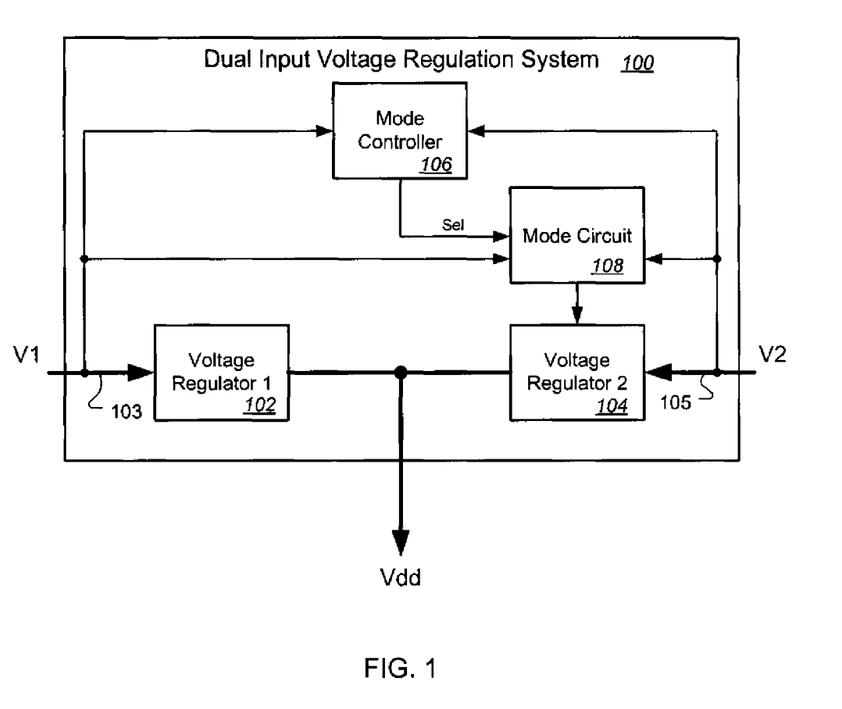
FIG. 1 illustrates an exemplary dual voltage input regulator system.

FIG. 1 shows an exemplary dual input voltage regulation system (DIVRS) 100 for regulating an output voltage Vdd from one of a number of voltage regulators. The DIVRS 100 includes a first voltage regulator 102 coupled to a first input node 103 at a voltage V1, and a second voltage regulator 104 coupled to a second input node at a voltage V2. Using current drawn from either of these input nodes 103, 105, the DIVRS 100 may provide a substantially regulated output voltage Vdd at an output node. The DIVRS 100 includes a mode controller 106 to monitor the input voltages V1 and V2. Based on the input voltages V1 and V2, the mode controller 106 selects either of two operating modes by activating or deactivating the voltage regulator 104. Based on the selected operating mode, the mode controller 106 may control a mode circuit 108 to generate a bias signal to the voltage regulator 104 to enable or disable the voltage regulator 104. In some other implementations, examples of which are described with reference to FIG. 3, a mode controller may selectively activate or deactivate multiple voltage regulators. In some examples, the mode circuit 108 may use the highest input voltage V1, V2 to generate a bias signal having sufficient voltage to substantially prevent reverse current flow through a disabled voltage regulator.

In some examples, the voltage regulators 102, 104 may be linear regulators with pass transistors (not shown) that are controllable to maintain the output voltage Vdd at a substantially constant level (e.g., 3.3V, 5V) using power from either of the input voltage nodes 103, 105. The voltages V1, V2 available at the input nodes 103, 105 may vary with time. For example, V1, V2 may be derived from various independent power sources through various interfaces, which may include, but are not limited to, primary batteries, secondary batteries, a cable with data and/or power signals (e.g., Universal Serial Bus (USB)), direct contact with an electrical connector, and/or radio frequency (RF) transmitted power.

In a smart card application, for example, power delivered to the DIVRS 100 may be received either at the input node 103 through direct physical contact with a standard interface (e.g., ISO 7816), or at the node 105 through energy contained in electromagnetic fields associated with a wireless (e.g., RF) signal. As such, voltage supplied to either the input node 103 or the input node 105 may increase or diminish as the smart card is placed in various positions. For example, as the smart card is placed into an appropriate RF field, the voltage at V2 may increase substantially.

In operation, the mode controller 106 draws operating power from the output node Vdd, which in turn may draw operating power from at least one of the input voltage nodes 103, 105. In this example, V1 may initially be powered before V2 is powered. The controller 106 selects an operating mode based on voltage levels of V1 and V2. Depending on the present voltage levels of V1 and V2, the mode controller 106 can set the bias voltage of the voltage regulator 104 using the mode circuit 108. Using the bias voltage, the mode circuit 108 may enable or disable the voltage regulator 104. For example, if the input voltage V1 is within a suitable operating range and the input voltage V2 is not within a suitable operating range, then the mode circuit 108 may apply a bias voltage to the voltage regulator 104 to disable the voltage regulator 104. If the input voltage V2 is within a suitable operating range and the input voltage V1 is not within a suitable operating range, then the mode circuit 108 may apply a bias voltage to the voltage regulator 104 to enable the voltage regulator 104. If both input voltages V1 and V2 are within a suitable operating range, then the mode circuit 108 may enable or disable the voltage regulator 104 based on the control signal received from the mode controller 106. The control signal from the mode controller 106 may be generated based on instructions (e.g., boot code) that are executed in response to an input from a user, for example. In some other implementations, examples of which are described with reference to FIGS. 3-4, the mode controller 106 may determine the highest available input voltage, and cause the corresponding regulator to be enabled, and all other regulators to be disabled.

In some implementations, the mode controller 106 and the mode circuit 108 cooperate to use the highest available input voltage to generate a disabling signal that substantially prevents reverse current from flowing through the voltage regulator 104. In the depicted example, the mode controller 106 generates a select (Sel) signal to the mode circuit 108. Based on the select signal, the mode circuit 108 selects either the voltage V1 or the voltage V2 to bias the voltage regulator 104. For example, when the voltage regulator 104 is deactivated in response to a condition in which V2<V1, the mode circuit 108 operates to bias the control terminal of a pass transistor (not shown) in the voltage regulator 104 substantially close to the voltage at V1 using, for example, a pull-up resistor (or a pull-down transistor for a negative voltage supply, e.g., −5V). In various implementations, using the highest available voltage to turn off the pass transistor in the deactivated regulator may ensure a high impedance to current flow from the Vdd node to the input node 105. The pass transistor may be, for example, a p-type metal oxide semiconductor (PMOS). In some other implementations, mode may be selected by a processor executing a program of stored instructions.

Figure 2:
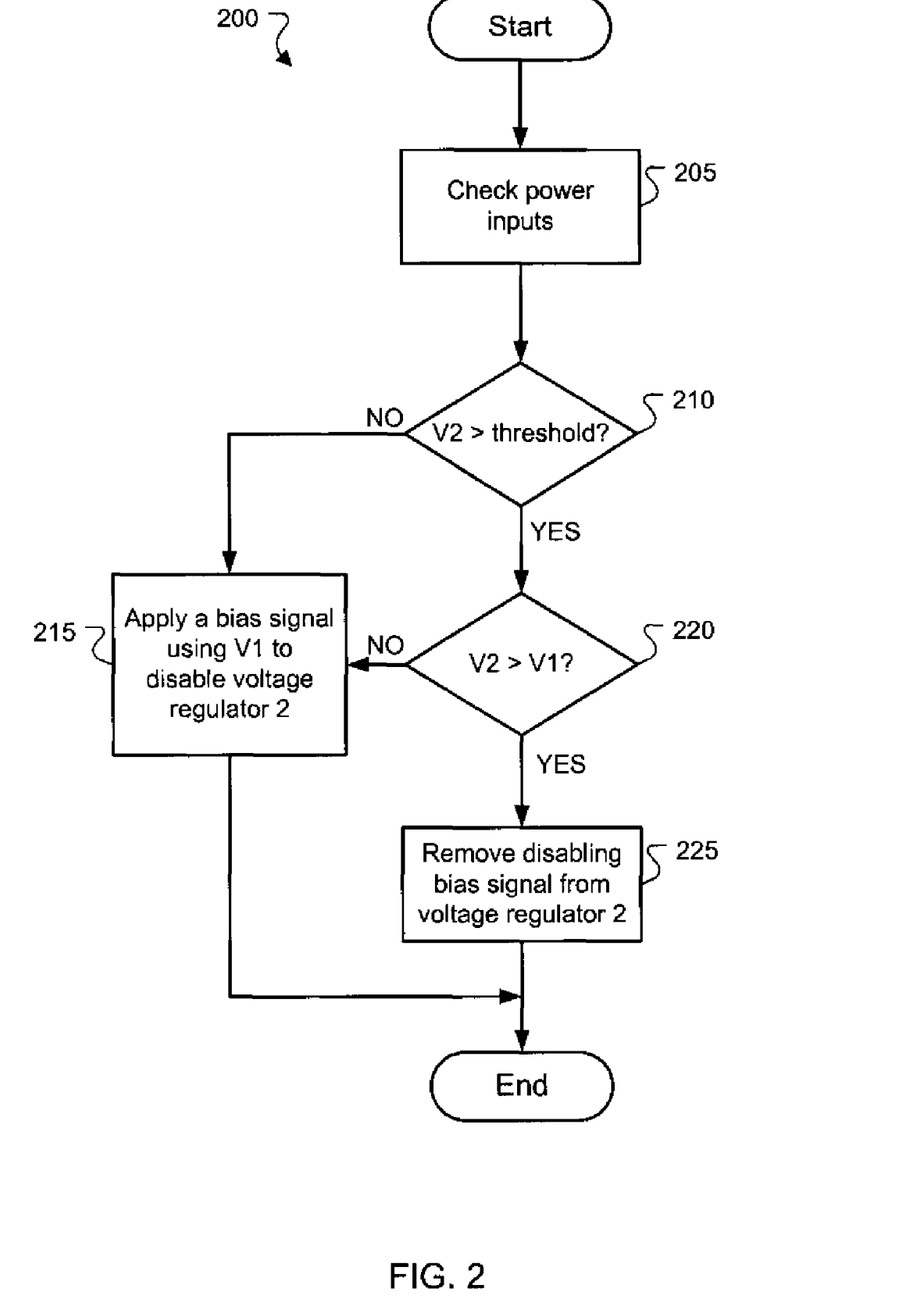
FIG. 2 shows a flow chart of an exemplary method for controlling a dual voltage input regulator system to select between a first and a second mode of operation.

FIG. 2 shows a flow chart that illustrates an exemplary method 200 to disable or enable a voltage regulator (e.g., the voltage regulator 104) to substantially prevent current flow from an output node (e.g., the Vdd node) to an input node (e.g., the input node 105). The method 200 includes operations that may be performed generally by, for example, the DIVRS 100. The operations may be performed under the control, supervision, and/or monitoring of a mode controller (e.g., the mode controller 106). Operations may also be supplemented or augmented by other processing and/or control elements that may be incorporated by other elements operatively coupled to the mode controller. Some or all of the operations may be performed by one or more processors executing instructions tangibly embodied in a signal. The processing may be implemented using analog and/or digital hardware or techniques, either alone or in cooperation with one or more processors executing instructions.

The method 200 may be described with reference to FIG. 1 (e.g., the DIVRS 100, which receives power from two independent input nodes 103, 105). For example, the method 200 may operate to disable a voltage regulator coupled to V2 when the input V2 is substantially inactive, or when the voltage V2 is less than the voltage V1. In this example, V1 is powered and active before V2.

The method 200 begins at step 205 when a check of the voltages V1, V2 at the input nodes is performed. Next, a determination is made, at step 210, whether voltage V2 is greater than a predetermined threshold. For example, the mode controller 106 may read a comparator output that compares the voltage V2 and a threshold voltage. If the voltage at V2 is not greater than the threshold, then a bias signal is applied using a voltage V1 to disable (e.g., through a pull-up or pull-down resistance) the voltage regulator coupled to V2 at step 215, and then the method 200 ends.

If, at step 210, the voltage V2 is greater than the threshold, then, at step 220, a determination is made whether the voltage V2 is greater than the voltage V1. If the voltage V2 is not greater than the voltage V1, then the step 215 is repeated. If the voltage V2 is greater than the voltage V1, then, at step 225, the disabling bias signal is removed from the voltage regulator coupled to V2, and then the method 200 ends.

Figure 3:
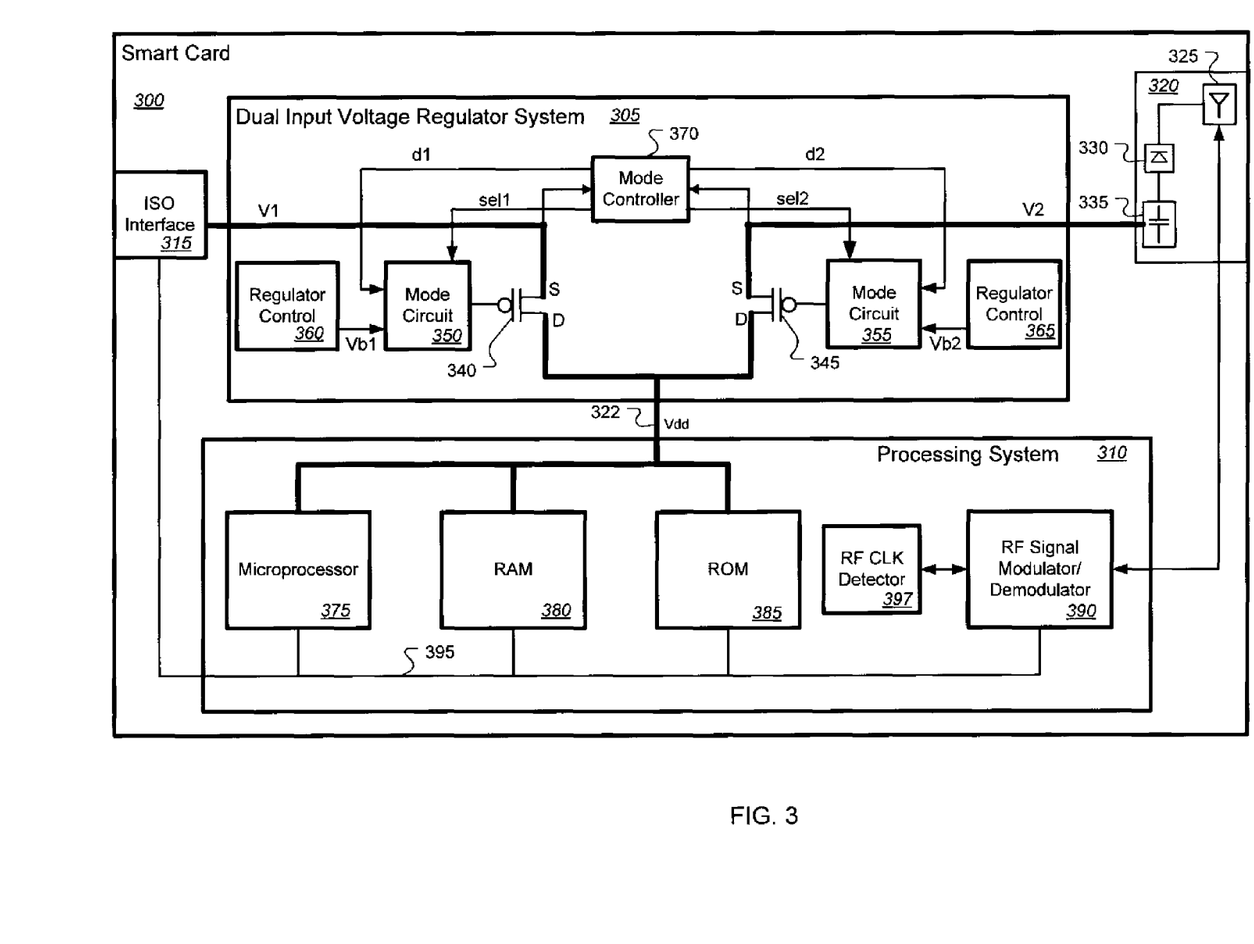
FIG. 3 illustrates an exemplary dual input voltage regulator in an exemplary smart card application that is configured to receive power through a direct connection to a first power source and/or from a radio frequency signal.

FIG. 3 illustrates an exemplary combination-type smart card 300 that includes a DIVRS 305 and a processing system 310. The smart card 300 is configured to receive power from either an ISO (International Standard Organization) interface 315 or through an RF interface 320. Depending on operating conditions, the DIVRS 305 selects whether to draw operating current from the ISO interface 315 or from the RF interface 320. The current that is drawn may be controlled to supply a substantially constant voltage Vdd at a output node 322. In some implementations, the DIVRS 305 may further perform such selection and regulation operation while substantially reducing or preventing reverse current from flowing from the output node 322 to either of the interfaces 315, 320, such as when these interfaces are not actively powered by a power source.

The DIVRS 305 may receive power from any of a number of different power sources, and power sources may be powered or depowered in various sequences. In the depicted example, the ISO interface 315 is a physical interface that can receive power through direct electrical contact between conductors connected to a power source, such as a battery or other external DC power supply, for example. The RF interface 320 converts RF signals that are coupled to an antenna 325. The RF interface 320 also includes a rectifier 330 and a capacitor circuit 335. For example, the rectifier may rectify energy in the received RF signals for storage in the capacitor circuit 335. In some implementations, received energy may also be stored by charging a battery (not shown) in the smart card 300.

In operation, current can flow from the ISO interface 315 through a transistor 340, or from the RF interface 320 through a transistor 345. In the example shown in FIG. 3, the transistors 340, 345 are PMOS transistors. The transistor 340 has a source terminal connected to the ISO interface 315 and a drain terminal connected to the output node 322 (Vdd). The transistor 345 has a source terminal connected to the RF interface 320 and a drain terminal connected to the output node 322. Each of the transistors 340, 345 has a gate terminal that can be biased to modulate the resistance between the respective source and drain terminals. At least in part, an operating characteristic for each of the transistors 340, 345 is a function of a gate-to-source voltage (Vgs). For example, when Vgs of a PMOS transistor is below a threshold voltage (Vth), the PMOS transistor may be in a conductive state.

The DIVRS 305 includes two mode circuits 350, 355 to supply a gate voltage to the transistors 340, 345, respectively. By manipulating the gate voltage, the mode circuits 350, 355 may enable or disable the transistors 340, 345, respectively. For example, the mode circuits 350 may disable the transistor 340 by raising Vgs substantially higher than Vth.

The DIVRS 305 also includes two regulator control circuits 360, 365 and a mode controller 370. These control circuits 360, 365 and the controller 370 cooperate to provide signals to control the mode circuits 350, 355. For example, the regulator control circuits 360, 365 generate regulated bias signals Vb1, Vb2 to bias the gates of the transistors 340, 345, respectively. In normal operation, for example, one of the regulator control circuits 360, 365 can generate a bias signal to regulate the output voltage Vdd at the drain of the corresponding transistor.

The mode circuits 350, 355 also receive control signals from the mode controller 370. The mode controller 370 supplies a control signal sel1 and a disable signal d2 to the mode circuit 350, and a control signal sel2 and a disable signal d2 to the mode circuit 355. Based on the control signal sel1, the mode circuit 350 selects to transmit to the gate terminal of the transistor 340 either Vb1 from the regulator control circuit 360 or d1 from the mode controller 370. Similarly, the mode circuit 355 selects to transmit to the gate terminal of the transistor 345 either Vb2 from the regulator control circuit 365 or d2 from the mode controller 370. In various examples, when sel1 is asserted, the mode circuit 350 selects to transmit Vb1. When sel1 is deasserted, the mode circuit 350 selects to transmit d1. Similarly, when sel2 is asserted, the mode circuit 355 transmits Vb2. When sel2 is deasserted, the mode circuit 355 transmits d2.

The mode controller 370 generates the control signals sel1, sel2 and the disable signal d1, d2 based on measured input voltages V1 and V2. In some implementations, the mode controller 370 may generate d1, d2 using the highest available input voltage V1, V2. For example, the mode controller 370 may be configured to supply the highest available input voltage as d1, d2 through a pull-up resistor. In a negative supply, pull-down resistors to the most negative available voltage may be used to generate d1, d2.

As an example, the mode controller 370 selects an operating mode based on V1, V2, and then generates sel1, sel2 according to the selected operating mode. In a first operating mode, the mode controller 370 activates the transistor 340 and deactivates the transistor 345. In a second operating mode, the controller 370 activates the transistor 345 and deactivates the transistor 340.

In an example, when V1 is greater than V2, the mode controller 370 selects the first operating mode by asserting sel1 to enable the transistor 340 and deasserting sel2 to disable the transistor 345. When the transistor 345 is disabled, the mode circuit 355 transmits the disable signal d2, which is the highest available input voltage, to the gate of the transistor 345. Biasing the gate terminal of the transistor 345 with the highest available voltage, in the first operating mode, may substantially reduce or prevent reverse current through the transistor 345 from the output node 322. When V1 is smaller than V2, the mode controller 370 selects the second operating mode by asserting sel2 to enable the transistor 345 and deasserting sel1 to disable the transistor 340. Similarly, a reverse current through the transistor 340 from the output node 322 is substantially prevented because the gate terminal of the transistor 340 is pulled-up to the highest available voltage.

In an illustrative example, an RF power source is active (e.g., supplying a voltage of 3.8V at V2) while the ISO power is substantially at zero volts. The mode controller 370 selects the second operating mode to enable the transistor 345 to supply current to the processing system 310. To reduce the possibility that current at the transistor 340 might flow in the reverse direction and causes a direct short between V2 (at approximately 3.8V) and V1 (at approximately 0V), the gate voltage of the transistor 340 is pulled higher than Vdd. The transistor 340 is thus held in a high impedance state by the mode circuit 350. Accordingly, transistors that are connected to inactive power sources may be effectively protected against reverse current conditions by pulling up the gate of the unselected transistor to the highest available input voltage.

In some implementations, the mode controller 370 may control the regulator control circuits 360, 365 such that only one of the transistors 340, 345 is active and supplying current to the output node 322. Exemplary implementations of this method are described with reference to FIG. 5.

In addition to the DIVRS 305, the smart card 300 further includes a processing system 310 that operates from the regulated voltage supplied by the DIVRS 305. The processing system 310 includes a microprocessor 375, a random access memory (RAM) 380, a read-only memory (ROM) 385, and a RF signal modulator/demodulator (modem) 390 for processing data, such as receiving, storing, processing, and/or transmitting information. As shown, the processing system 310 also includes bus 395 for data communication. For example, the microprocessor 375 may execute software and then process data stored in the RAM 380. In some implementations, the ROM 385 may store boot code that the microprocessor 375 executes upon activation of the smart card 300.

In some applications, the microprocessor 375 may also transmit and/or receive data from an external source via the ISO interface 315 (e.g., ISO 7816 contact interface) and/or the RF interface 320 (e.g., ISO 14443 contactless interface). For example, the microprocessor 375 may use software stored in the RAM 380 to transmit and receive data according to a predetermined communication protocol used by the ISO interface 315. In some implementations, the microprocessor 375 may also transmit and receive data to/from the RF interface 320 using the RF signal modem 390. For example, the processing system 310 may receive data by modulating a RF signal that also provides power to the smartcard 300 through the rectifier 330. In some implementations, the smart card 300 may also use the RF signal modem 335 to transmit data to a receiving device via the RF interface 320.

In the depicted example, the processing system 310 also includes a RF clock detector 397 to detect, monitor, and shape a clock signal embedded in a received RF signal. In some implementations, the RF clock detector 397 may detect a clock frequency used by an external source. The detected clock frequency may be used to generate a signal that drives a system clock to control, for example, a modem, processor unit, and peripheral circuits. In an illustrative example, data reception may be handled using an analog envelop detector circuit and bandpass filter to demodulate an amplitude modulated (AM) signal. Data transmission may be handled by inducing and removing a short circuit across the terminals of the antenna 325. A reader system may be configured to the resulting changes in inductance. Transmitted data may be encoded using, for example, binary phase shift keying.

Using the DIVRS 305, the processing system 310 may operate using either the power received from the ISO interface 315, or the power received from the RF interface 320.

Figure 4A:
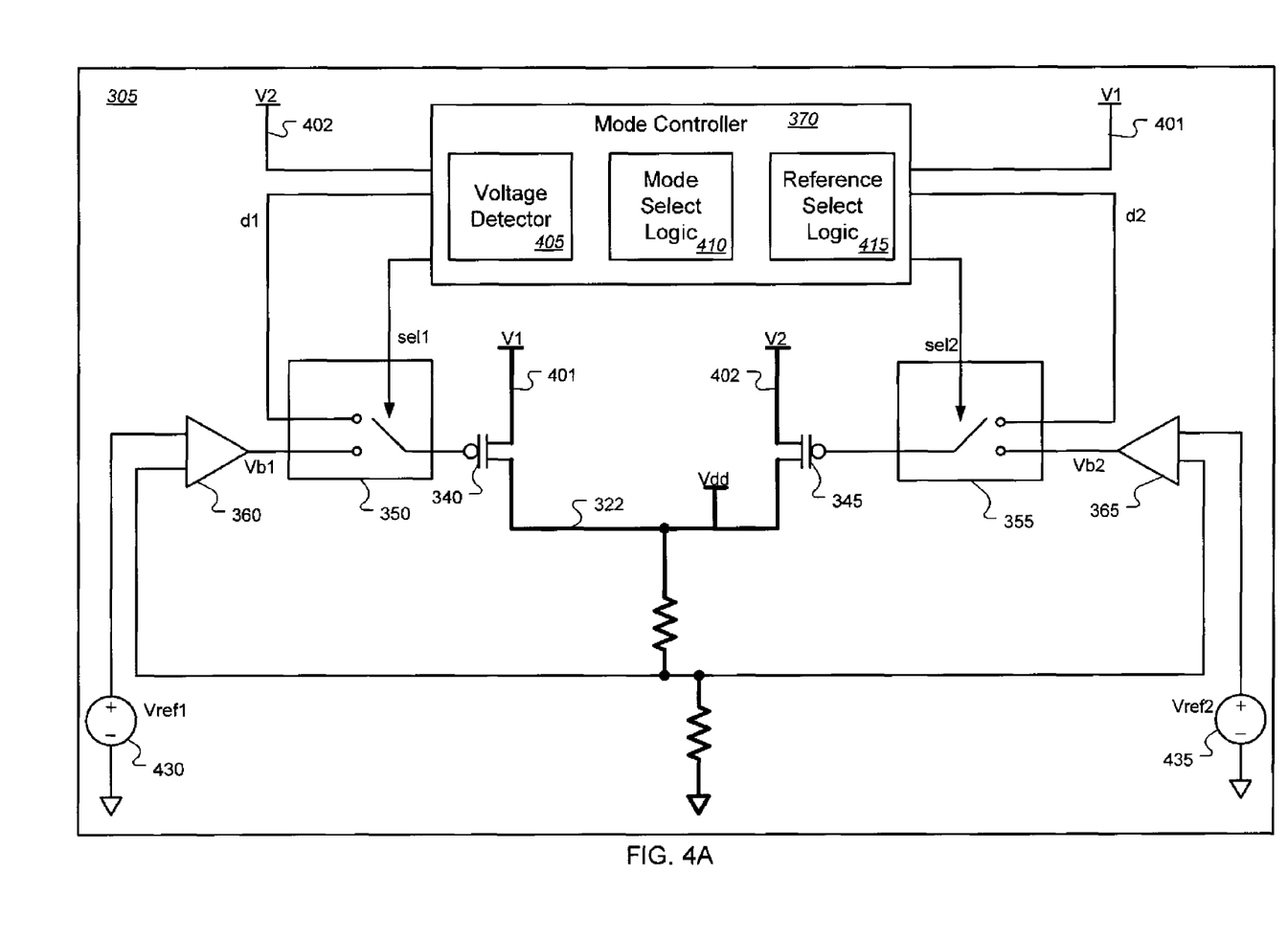
FIGS. 4A-4B show schematics of exemplary dual input voltage regulators.
Figure 4B:
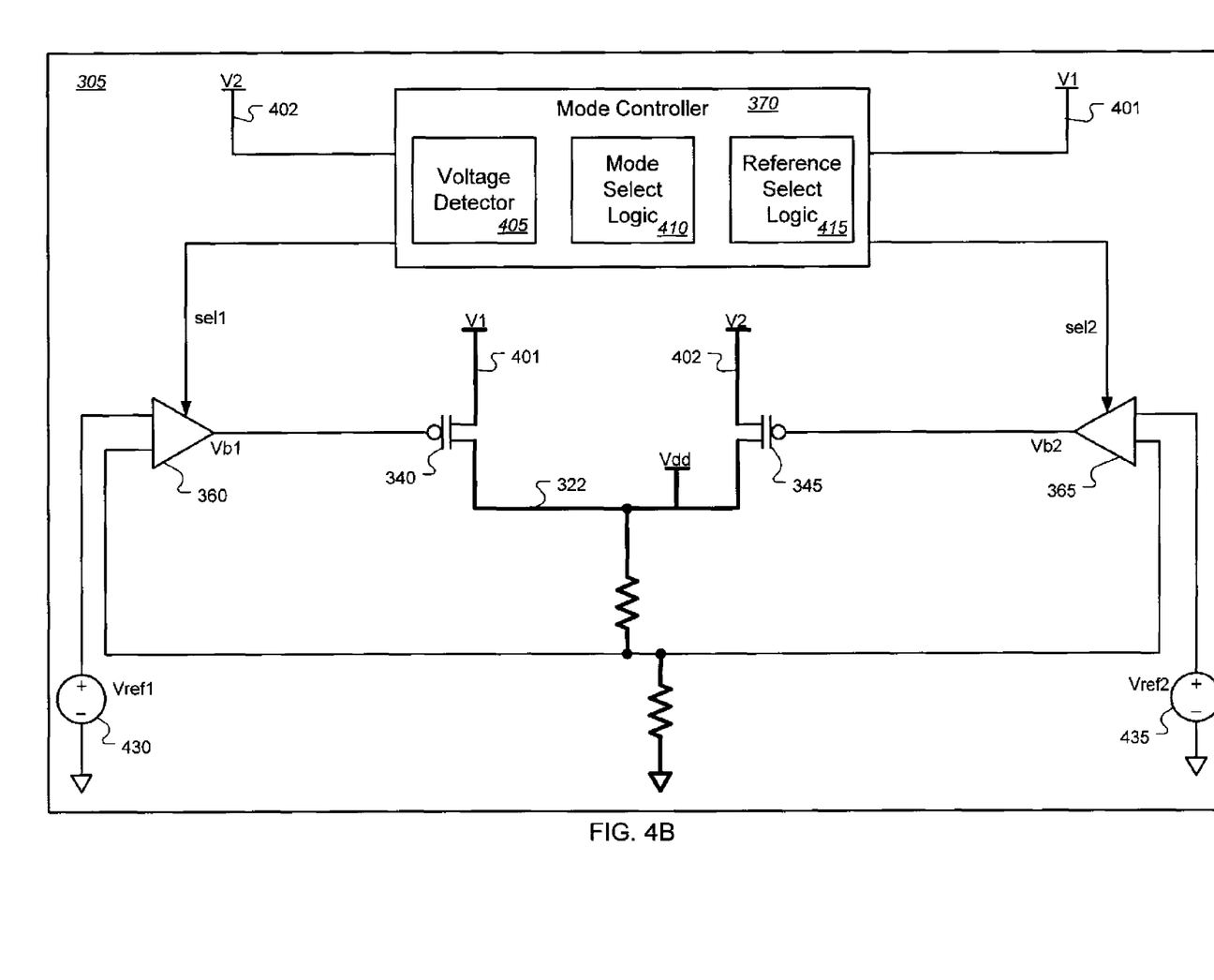

FIGS. 4A-4B show exemplary circuits that implement the DIVRS 305. As shown in FIG. 4A, the DIVRS 305 receives independently sourced power inputs from an input node 401 at voltage V1 and another input node 402 at voltage V2. In the first operating mode, the DIVRS 305 may select to enable the transistor 340 and to disable the transistor 345. In the second operating mode, the DIVRS 305 may select to enable the transistor 345 and to disable the transistor 340. The DIVRS 305 may enable or disable the transistors 340, 345 using the mode circuits 350, 355.

In the depicted example, the mode circuits 350, 355 are implemented as multiplexers (MUXs). The mode circuits 350, 355 receive control signals sel1 and sel2, respectively, from the mode controller 370. Using these control signals, the mode circuits 350, 355 provide a selected input to a gate of the transistors 340, 345, respectively, to enable or disable the transistors 340, 345.

Both of the mode circuits 350, 355 may receive two separate gate bias voltages. The mode circuits 350 may receive Vb1 from the regulator control circuit 360 and d1 from the mode controller 370. The mode circuit 355 may receive Vb2 from the regulator control circuit 365 and d2 from the mode controller 370. Based on the control signals (sel1 or sel2), the mode circuits 350, 355 selects one of the two bias voltages to be transmitted to the transistors 340, 345, respectively.

The mode controller 370 includes a voltage detector 405, a mode select logic 410, and a reference select logic 415. The voltage detector 405 is configured to detect whether V1 at the input node 401 is above a threshold (e.g., 2.3 V, 3.3 V, etc.) and whether V2 at the input node 402 is above a threshold. In some implementations, the voltage detector 405 may generate a signal indicating whether V1 is greater than the threshold and another signal indicating whether V2 is greater than the threshold. In some implementations, the mode controller 370 may use the generated signal to determine whether the regulator control circuits 360, 365 are activated.

In some implementations, the mode select logic 410 receives a signal indicating whether V1 at the input node 401 is within an acceptable voltage range, a signal indicating whether V2 at the input node 402 is within an acceptable voltage range, and a signal indicating a preferred voltage supply setting to the input node 401 or the input node 402. Based on the received signals, the mode select logic 410 selects one of the input node 401, 402 to be the active voltage supply. When only one of the input voltages V1, V2 are within the acceptable voltage range, the mode select logic 410 may select the input node with the acceptable voltage as the active voltage supply.

When both of the input voltages V1, V2 are within the acceptable voltage range, the mode select logic 410 may use the preferred voltage supply signal to determine which of the input nodes 401, 402 to be the active voltage supply. In one implementation, the preferred voltage supply may be set to an input node that supplies the highest voltage. In other implementations, the preferred voltage supply may be selected by a manufacturer or by a user. For example, the user may set the input node 402 to be the preferred voltage supply. In this case, the mode select logic 410 may select the input node 402 as the active power supply when V2 is in the acceptable range, even if V1 is higher than V2. Such techniques may be used to provide dual regulation in stand-alone and/or networked systems. Selections may be implemented in a smart card system, for example, by executing code stored in a data store, such as the ROM 385, or by a signal received at a port (e.g., input/output (I/O)) pin.

FIG. 4B shows an exemplary circuit in which the regulator control circuits 360, 365 directly generate gate bias signals to the transistors 340, 345 without passing through a MUX. In this example, the control signals sel1, sel2 directly enable or disable the regulator control circuits 360, 365. When disabled, each of the regulator control circuits 360, 365 operates to disable its corresponding transistor 340, 345. An example of operation for the mode select logic 410 is described with reference to FIG. 5.

In some implementations, the gate bias voltages Vb1, Vb2 generated by the regulator control circuits 360, 365 may be controlled by the reference select logic 415. As shown in FIGS. 4A-4B, the regulator control circuit 360 receives a reference voltage Vref2 from a voltage source 430, and the regulator control circuit 365 receives a reference voltage Vref2 from the voltage source 435. In some examples, the voltage sources 430, 435 may be controlled by the reference select logic 415 depending on the present operating mode.

In some implementations, a reference voltage supplied to the unselected regulator control circuit may be adjusted to be only a fraction of the target regulation voltage level. This may allow the unselected regulator to restore full operating voltage more quickly when the selected regulator fails to maintain regulation of the output voltage at the target regulation voltage. For example, in the first operating mode, the reference select logic 415 may select a higher reference voltage (e.g., 1.6 V) for the regulator control circuit 360 and a lower reference voltage (e.g., 1.4 V) for the regulator control circuit 365. In the second operating mode, the reference select logic 415 may select a higher reference voltage for the regulator control circuit 365 and a lower reference voltage for the regulator control circuit 360.

Figure 5:
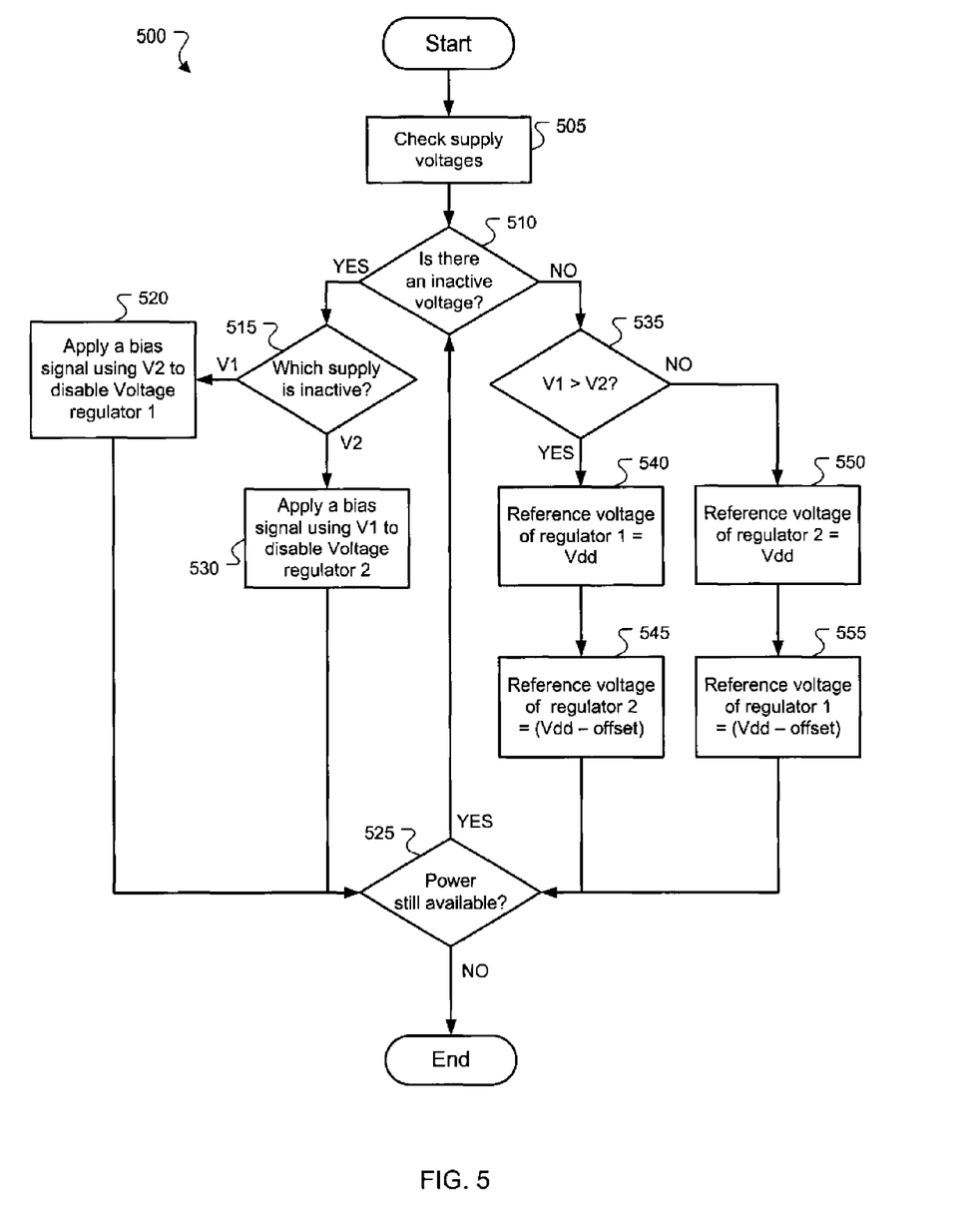
FIG. 5 shows a flow chart of an exemplary method for operating a dual input voltage regulator.

FIG. 5 shows a flow chart that illustrates an exemplary method 500 of operations for substantially preventing reverse current through an inactive regulator. The method 500 includes operations that may be performed generally by a mode controller (e.g., the mode controller 370). For example, the operations may be performed under the control, supervision, and/or monitoring of a mode selection logic (e.g., the mode select logic 410) and a reference select logic (e.g., the reference select logic 415). Operations may also be supplemented or augmented by other processing and/or control elements that may be incorporated by other elements coupled to the mode controller. The processing may be implemented using analog and/or digital hardware or techniques, either alone or in cooperation with one or more processors executing instructions.

The method 500 begins at step 505 when a check of the supply voltages, V1, V2 is made, examples of which are described with reference to FIG. 3. Next, a determination is made, at step 510, whether there is an inactive voltage. For example, the mode controller 370 may use the voltage detector 405 to detect whether any of the input nodes are not coupled to an active power source.

If there is an inactive voltage, then a determination is made which of the two input voltages V1 and V2 are inactive at step 515. For example, the mode controller may check a signal generated by the voltage detector 405. If V1 is inactive, then, at step 520, a bias signal may be applied using V2 to disable a voltage regulator that is connected to V1. In some implementations, the reference select logic 415 may select a target reference voltage for the regulator connected to V2 and disable the regulator connected to V1 by applying a sufficiently high gate voltage. Next, a determination is made, at step 525, whether the power is still available. If power is not available, then the method 500 ends. If power is still available, then the step 510 is repeated.

At step 515, if it is determined that V2 is inactive, then, at step 530, a bias signal is applied using V1 to disable a voltage regulator that is connected to V2. For example, the reference select logic 415 may select a target reference voltage for the regulator connected to V1 and disable the regulator connected to V2 by applying a sufficiently high gate voltage. Next, the step 525 is repeated.

If, at step 510, there is no inactive voltage, then a comparison is made between the voltage at V1 and V2 at step 535. If the voltage at V1 is greater than the voltage at V2, then the reference voltage for the regulator of V1 is selected to be Vdd at step 540 and the reference voltage for the regulator of V2 is set to be Vdd less an offset at step 545. For example, if the Vdd is set to 1.6 V and the offset is set to 0.2 V, then the reference voltage for the regulator of V1 is 1.6 V and the reference voltage for the regulator of V2 is 1.4 V. After the reference voltages are configured, then the step 525 is repeated.

If, at step 535, the voltage at V2 is greater than the voltage at V1, then, at step 550, the reference voltage for the regulator of V2 I selected to be Vdd and, at step 555, the reference voltage for the regulator of V1 is selected to be Vdd less an offset. After the reference voltages are set, the step 525 is repeated.

Although an example of a system has been described with reference to the above figures, other implementations may be deployed in other processing applications, such as desktop and/or networked environments.

In some implementations, other operating modes may be used. For example, the mode controller 370 may be configured to generate mode control signals for selecting an active voltage regulator between more than two voltage regulators. For example, a DIVRS may include more than two voltage inputs, such as three or more voltage inputs. A voltage regulator associated with each input may be controlled by a mode circuit responsive to a mode control signal. The mode controller may, for example, monitor each voltage input signal, determine the highest available voltage, and generate mode control signals to each mode circuit to substantially prevent current from flowing from the highest available voltage to the other voltage inputs through their corresponding voltage regulator circuits. In some implementations, the mode controller can generate control signals to cause multiple voltage regulators to be disabled based on information about the input voltages.

In some other implementations, current regulators may be used. In an example of such an implementation, detector circuitry monitors both the voltage and the current flowing through shunts of the current regulators. At start-up, the pass transistors initially are both off. In response to the supply voltages (V1 or V2) being activated, the voltage on the source side of the PMOS transistor rises. As the source voltage increases above a threshold, the regulator's current shunt stage may be turned on. Once sufficient current is running through the shunt, the regulator's pass transistor may be turned on.

In some implementations, the DIVRS 100 or the DIVRS 305 may include additional logic to provide mode control for using voltage supplies that are negative with respect to a circuit reference voltage (e.g., ground). For example, the DIVRS 305 may use N-channel MOS for such negative voltages. When the DIVRS 305 is supplied by the negative voltages, the mode controller 370 may disable voltage regulators by pulling the MOS gate voltage substantially toward the most negative available input supply voltage.

In some implementations, the mode selection by the mode controller 106 or the mode controller 370 may be based on one or more factors, taken alone or in combination. For example, factors may include, any or all of hysteresis, filtering, or providing a default mode value, voltage thresholds, and/or a time delay.

In some implementations, the mode controller 370 may implement hysteresis to reduce undesirable mode switching. For example, when V1 is substantially close to V2, the mode controller 370 may not change operating mode even when the present active voltage is slightly less than the unselected voltage.

The mode controller 370 or the mode controller 106 may also read a default mode value to select the operating mode. In some implementations, the default-mode value may be preset by, for example, a user or a manufacturer. For example, in the smart card 300, the manufacturer may select a default mode value to be the RF power supply. When the voltage of the RF power supply is substantially close to the ISO power supply, the mode controller 370 may select the RF power supply to be the active power supply. In various implementations, this may involve the microprocessor 375 executing instructions (e.g., boot code) stored in a data store, such as the ROM 385, for example.

In some implementations, the mode controller 106 or the mode controller 370 may include different voltage thresholds for V1 and V2. For example, the mode controller 370 may require different minimum active levels for each of the power supplies V1 and V2. For example, in the smart card 300, the mode controller 370 may require the V1 to be at least 1.5 V to be considered active but the mode controller 370 may require the V2 to be at least 2.3 V to be considered active.

In some implementations, the mode controller 106 or the mode controller 370 may include, for example, a filter and/or a digital delay before switching operating mode to avoid mode switching due to noise or transient voltages. The filter may actively and/or passively low pass filter, for example, voltages at one or more input nodes. Filtering may be supplemented with digital signal processing. For example, the smart card 300 may temporarily receive a spike of voltage at the RF interface 320 when, for example, a computer is turned on near the smart card 300. If the mode controller 370 includes an resistor-capacitor (RC) network and/or a time delay before switching operating mode, the smart card 300 may continue to be supplied by the V1 without changing to the V2 and back. This may improve stability and reduce noise on the current supplied to the processing system 310.

In some implementations, bipolar junction transistors (BJT) instead of PMOS may be used. For example, a mode controller may be implemented to control a base voltage of a BJT to enable and disable a voltage regulator. By doing so, a reverse current may be substantially prevented through the disabled BJT.

Although described in the context of the smart card applications, some implementations may be advantageously used in other multiple input, single output voltage regulator system applications. For example, systems that use positive and/or negative power supplies may be implemented in view of implementations described herein.

Although particular features of an architecture have been described, other features may be incorporated to improve performance. For example, caching (e.g., L1, L2, etc. . . .) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades). One or more communication interfaces may be provided in support of data storage and related operations.

Some systems may be implemented as a computer system that can be used with implementations of the invention. For example, various implementations may include digital and/or analog circuitry, computer hardware, firmware, software, or combinations thereof. Apparatus can be implemented in a computer program product tangibly embodied in an information carrier, e.g., in a machine-readable storage device or in a propagated signal, for execution by a programmable processor; and methods can be performed by a programmable processor executing a program of instructions to perform functions of the invention by operating on input data and generating an output. The invention can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system 100 may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

A number of implementations of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A system comprising:
 a first regulator coupled to a first input node and operable in a first mode to regulate a voltage at an output node;
 a second regulator coupled to a second input node and operable in a second mode to regulate the voltage at the output node;
 a mode circuit that disables current flow through one of the first or the second regulator to the output node depending on the mode including generating a bias signal using a voltage provided by an operating regulator of the first or second regulator for a given mode applied through a pull up or pull down resistor to disable a pass transistor associated with a respective one of the first or the second regulator depending on the mode; and
 a controller to select the first mode or the second mode based on which of the first regulator or the second regulator has a highest voltage including to select the first mode when a first voltage level signal associated with the first input node is greater than a second voltage level signal associated with the second input voltage node, and to select the second mode when the first voltage level signal is less than the second voltage level signal.

2. The system of claim 1, wherein the mode circuit uses a bias signal pulled up to the first input node to disable current flow through the second regulator.

3. The system of claim 1, wherein the second regulator comprises a transistor with a first terminal connected to the second input node and a second terminal connected to the output node.

4. The system of claim 3, wherein the mode circuit disables the transistor by causing a voltage at a gate terminal of the transistor to be pulled up to a voltage at the first input node.

5. The system of claim 4, wherein the gate terminal of the transistor is biased during the second mode to regulate the voltage at the output node.

6. The system of claim 1, further comprising:
a first filter to generate the first voltage level signal from a voltage at the first input node, and
a second filter to generate the second voltage level signal from a voltage at the second input node.

7. The system of claim 1, wherein the controller changes from selecting the first mode to selecting the second mode only after the first voltage level signal falls below the second voltage level signal by a first predetermined amount, and wherein the controller changes from selecting the second mode to selecting the first mode only after the second voltage level signal falls below the first voltage level signal by a second predetermined amount.

8. The system of claim 1 further comprising a smart card including the first regulator, second regulator, the mode circuit, and the controller.

9. A system comprising:
a first regulator comprising a first transistor, wherein in a first mode the first transistor operates to regulate a voltage on an output node by modulating a voltage drop between a supply terminal connected to a first voltage supply node and an output terminal connected to the output node;
a second regulator comprising a second transistor, wherein in a second mode the second transistor operates to regulate the voltage on the output node by modulating a voltage drop between a supply terminal connected to a second voltage supply node and an output terminal connected to the output node;
a mode circuit to bias a control terminal of one of the first transistor or the second transistor to prevent a given transistor from conducting current in a respective other mode including generating a bias signal using a voltage provided by an operating one of the first or second regulator for a given mode and applied through a pull up or pull down resistance to bias the first or the second transistor given the mode; and a controller
to select the first mode in response to the voltage at the first voltage supply node having the highest available voltage level; and
to select the second mode in response to the voltage at the second voltage supply node having the highest available voltage level.

10. The system of claim 9, wherein in the second mode, the mode circuit operates to bias a voltage at the control terminal of the first transistor close to the highest available voltage level.

11. The system of claim 9, further comprising a second mode circuit to bias a control terminal of the second transistor to prevent the first transistor from conducting current in the first mode.

12. The system of claim 11, wherein in the first mode, the second mode circuit operates to bias the control terminal of the second transistor close to the highest available voltage level.

13. The system of claim 9, wherein the first regulator draws operating power from the first voltage supply node.

14. The system of claim 9, wherein the second regulator draws operating power from the second voltage supply node.

15. The system of claim 9, wherein the controller draws operating power from the output node.

16. The system of claim 9, wherein at least one of the first and second voltage sources is powered by a radio frequency (RF) signal.

17. The system of claim 9, wherein the first and second regulators comprise linear regulators for regulating voltage.

18. The system of claim 9, wherein the first and second transistors each comprise a field-effect transistor.

19. The system of claim 9, wherein the first and second voltage supply nodes are each connected to independent power sources.

20. The system of claim 9, further comprising:
at least one additional regulator, each additional regulator comprising an additional transistor, wherein each additional transistor operates in a corresponding additional mode to substantially regulate the voltage on the output node by modulating a voltage drop between a supply terminal connected to a corresponding additional voltage supply node and an output terminal connected to the output node.

21. The system of claim 20, wherein the mode circuit is further to bias a control terminal of each additional transistor to substantially prevent the additional transistor from conducting except when a corresponding mode is selected.

22. The system of claim 20, wherein the controller is further operable to select a mode corresponding to the transistor connected to the additional voltage supply node having the highest available voltage level.

23. The system of claim 9 further comprising a smart card including the first regulator, second regulator, the mode circuit, and the controller.

* * * * *